United States Patent [19]

Ding et al.

[11] Patent Number: 4,703,326

[45] Date of Patent: Oct. 27, 1987

[54] METHOD AND APPARATUS FOR MEASURING PRESSURES IN A ROTOR OF A TURBOMACHINE

[75] Inventors: Kurt Ding, Augsburg; Helmut Brandt, Munich; Josef Wenzl, Herbertshausen, all of Fed. Rep. of Germany

[73] Assignee: MTU Motoren-und Turbinen-Union Munchen GmbH, Munich, Fed. Rep. of Germany

[21] Appl. No.: 821,695

[22] Filed: Jan. 23, 1986

[30] Foreign Application Priority Data

Jan. 24, 1985 [DE] Fed. Rep. of Germany .... 3502278.7

[51] Int. Cl.[4] .......................... G01D 7/00; G01D 7/02; G01D 7/04

[52] U.S. Cl. .......................... 340/870.16; 340/870.17; 340/870.11; 340/870.31; 73/116

[58] Field of Search ...................... 340/870.16, 870.25, 340/870.31, 870.32, 870.34, 870.17, 870.11; 73/116

[56] References Cited

U.S. PATENT DOCUMENTS

| | | | |
|---|---|---|---|
| 3,713,124 | 1/1973 | Durland et al. | 340/870.25 |
| 4,150,358 | 4/1979 | Aviander | 340/870.31 |
| 4,414,853 | 11/1983 | Bryzek | 340/870.17 |
| 4,418,411 | 11/1983 | Strietzel | 340/870.16 |
| 4,502,043 | 2/1985 | Moore | 73/116 |
| 4,563,682 | 1/1986 | Merkel | 340/870.17 |

FOREIGN PATENT DOCUMENTS

| | | |
|---|---|---|
| 664160 | 1/1950 | United Kingdom . |
| 1152883 | 4/1967 | United Kingdom . |
| 2039995 | 1/1980 | United Kingdom . |

*Primary Examiner*—John W. Caldwell, Sr.
*Assistant Examiner*—Mahmoud Fatahi-yar
*Attorney, Agent, or Firm*—Roberts, Spiecens & Cohen

[57] ABSTRACT

A method and apparatus for measuring pressures in a gas turbine engine comprising a stator, a hollow rotatable shaft carrying a rotor and a first sensor having a plurality of inputs for pressure measured at respective test points on the rotor. Within the shaft are the following: a selector switch for selection of signals from respective test points, a stepping motor for driving the selector switch stepwise, a pressure module for converting the pressure signal from the sensor to an electrical signal, a further module for receiving inputs related to further conditions such as temperature, a first transmitter module for the telemetric remote transmission of the pressure signals from the pressure module, a second transmitter module for the telemetric remote transmission of the further conditions, a carrier for the first and second transmitter modules and a transmitter antenna connected to the first and second transmitter modules for transmitting the signals indicative of pressure and the further conditions as test data to the stator. A non-contact inductive current supply is connected to the first and second transmitter modules.

24 Claims, 5 Drawing Figures

METHOD AND APPARATUS FOR MEASURING PRESSURES IN A ROTOR OF A TURBOMACHINE

FIELD OF THE INVENTION

This invention relates to methods and apparatus for measuring pressures in rotating systems, such as turbomachines, having at least one stationary bearing member rotatably supporting a shaft carrying a rotor.

BACKGROUND AND PRIOR ART

When test data, especially pressure test data, in rotating systems are being acquired, the data, at least for turbomachines and especially gas turbine engines, generally must be transmitted to an external location. For this purpose, various known means are employed.

In one known arrangement, compressed air lines connected to a pneumatic test point selector switch are separately sealed with axially offset O-rings.

Any sealing effect achieved by the use of O-rings has the disadvantage, however, that the seal is suitable only for low rotational speeds and particularly for speeds below 6000 rpm. O-rings are subject to wear and their useful lives are relatively short particularly at high speeds. Designs of this type also require that the shaft end be readily accessible.

Additionally, the test data may be adversely affected by temperature conditions.

In another known solution the test signals are transmitted via slip rings and pressure sensors rotating on the rotor shaft. The useful life of this equipment is disadvantageously short as the slip rings are subject to wear in service. Again, the shaft end must be readily accessible.

SUMMARY OF THE INVENTION

A broad aspect of the present invention is to provide a test arrangement for the multichannel measurement of a number of pressures, temperatures, or like parameters, on rotating parts during operation and under external control, where the test data are transmitted to an external point with a minimum of distortion. The test arrangement according to the invention has the advantages of further extending the operational speed and temperature ranges, facilitating the installation and removal of the components and simiplifying the power and actuating air supplies. The test arrangement of the invention also arranges the components such that they will not wear in service so that maximum measuring accuracy is achieved over a long period of time.

The arrangement provided by the invention consists of the coaxial assembly inside a tubular shaft of:

a pneumatic/electrical test point selector switch, a pneumatic stepping motor for the co-rotating test point selector switch, a retaining and connecting component for the selector switch, a pressure sensor, at least one further sensor, a test data transmitter for the telemetric remote transmission of the pressure signal, a test data transmitter for the transmission of further test data, such as temperature, a carrier for the transmitter module of the pressure sensor and a transmitter antenna, and a power supply coil, the transmitters transmitting the telemetric test data to the stator or the casing of the machine.

The invention also contemplates a method of measuring pressures in a rotor of a turbomachine comprising the steps of measuring pressure at a plurality of test points in a rotating part of a turbomachine, selecting a test point at which the pressure is to be determined, receiving the pressure at the selected test point and converting the pressure to an electrical signal, measuring further conditions in the turbomachine and converting the same to electrical signals, transmitting the signals representing the pressure and the further conditions telemetrically to a remote stationary location, and supplying electrical power to the equipment on the rotating part which serves to carry out the above steps, said electrical power being supplied from a stationary location, inductively without contact, to said equipment. According to a feature of the method, the pressure signals are compensated for temperature by remote telemetric transmission of temperature signals.

The test arrangement of the invention affords essential advantages by substantially increasing the speed range in which the measurements can be achieved as compared to that associated with known test devices. In fact, operational speeds far exceeding 20,000 rpm have been used over extended periods. No upper temperature limit exists at the pressure test points. Special cooling for the shaft is not required.

Non-contact telemetric signal transmission provides the advantage that it will not adversely affect the useful life or the precision of the arrangement.

Moreover, by non-contact transmission of actuating air to a pneumatic stepping motor operating the test point selector switch and non-contact power supply via inductively coupled coils the useful life is extended as the apparatus is not subject to the wear as is the case with the known test devices.

A special advantage is also provided by constructing the test arrangement as a plug-in unit for accommodation inside a tubular shaft. In the event of defects, or if recalibration becomes necessary, the plug-in unit can readily be installed and removed at one end of the tubular shaft. Installation and calibration are again facilitated by the supply of compressed air at one end of the tubular shaft and power at the other. Installation and removal are also facilitated by constructing the test arrangement with axially or mutually pluggable components, such as the temperature sensor, pressure sensor, their carrier and transmitter (antenna), and the pressure selector switch and stepping motor.

DETAILED DESCRIPTION OF THE PREFERRED EMBODIMENTS

Figure 5:
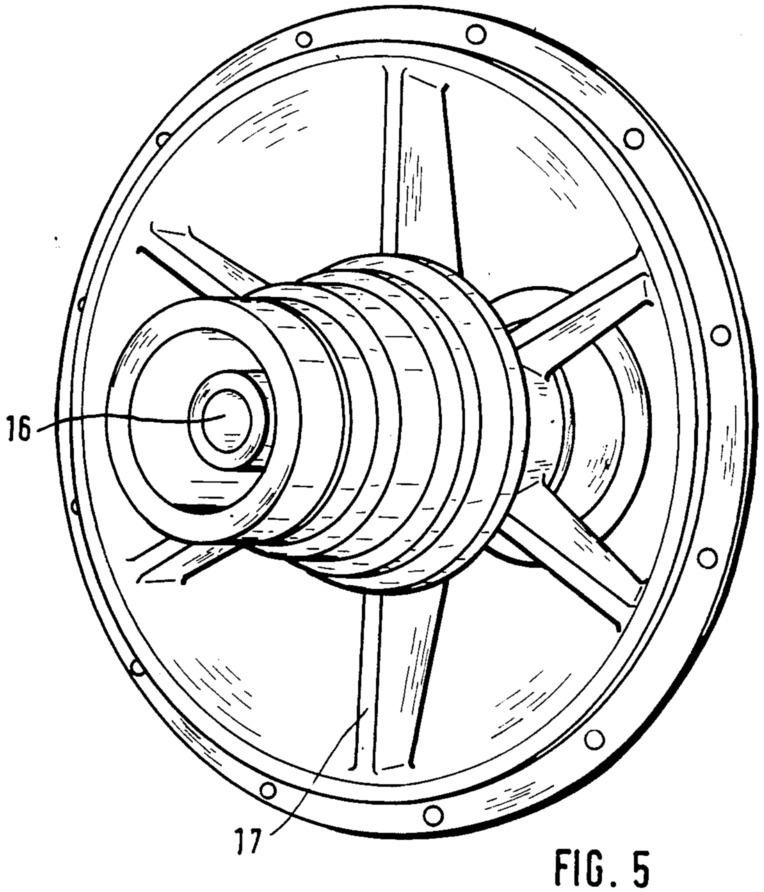
FIG. 5 diagrammatically illustrates the test unit and the telemetry system installed in a turbomachine.

The present invention is essentially directed to a method and apparatus for multichannel test data acquisition, transmission and interpretation utilizing non-contact remote data transmission. Selection is made between several test points by means of a pneumatically activated system which is externally controlled and permits preselection of the test points by means of a control unit 20 operating pneumatic valves 19. These valves, in turn, act on a pneumatic stepping motor 4 connected to a test point selector switch 2. An essential feature of the invention is the provision of a self-contained unit which can be plugged in or unplugged from the rest of the apparatus as will be explained in greater detail later. The unit essentially comprises pneumatic motor 4, pressure selector switch 2, one or more sensors and a transmitter means. The unit can be accommodated inside a tubular shaft 16 ( see FIGS. 2 and 5).

Figure 1:
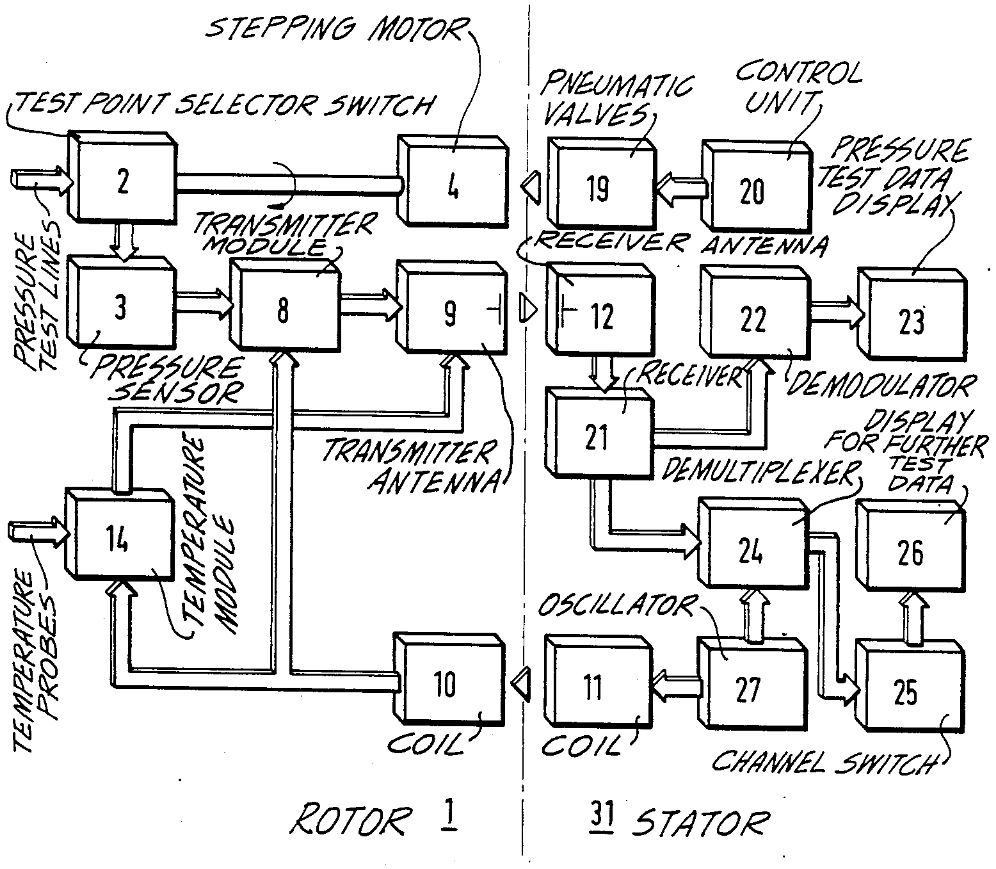
FIG. 1 is a block diagram showing the circuit arrangement of essential components of the invention.

As it will also become apparent from FIG. 1, associated with a rotor 1 is the pressure selector switch 2 which is connected to a pressure sensor 3, which communicates with a transmitter module 8 which in turn is connected to a transmitter antenna 9. Also provided is a transmitter module 14 for temperature to correct the pressure signal from module 8. The output signals from the transmitter module are transmitted via a transmitter antenna 9 to a receiver means on stator 31. The elements associated with the rotor 1 are arranged thereon.

As also been from FIG. 1 at the right, the stator 31 accommodates a receiver antenna 12, a receiver 21, a demodulator 22 and a demultiplexer 24 communicating with one another. The demodulator 22 is connected to a pressure test data display 23, whereas the demultiplexer 24 is connected to a channel switch 25 and a display 26 for further test data, such as temperature. FIG. 1 also illustrates the power supply or the power feed for a test data amplifier (not shown) and for the transmitter modules 8,14 for the telemetric transmission of the data. For this purpose, an induction coil 11 in the stator is connected to an oscillator 27. Inductively coupled to the induction coil 11 in the stator is an induction coil 10 in the rotor, which in turn is connected to the transmitter module 8 for pressure, to temperature module 14 and/or to other modules for test data, said modules, in turn, being connected to the transmitter antenna 9.

While FIG. 1 illustrates only two channels for the telemetric system, i.e. pressure and temperature, a plurality of channels for other test data such as torque, acceleration, strain, and the like can naturally be obtained and transmitted.

Figure 2:
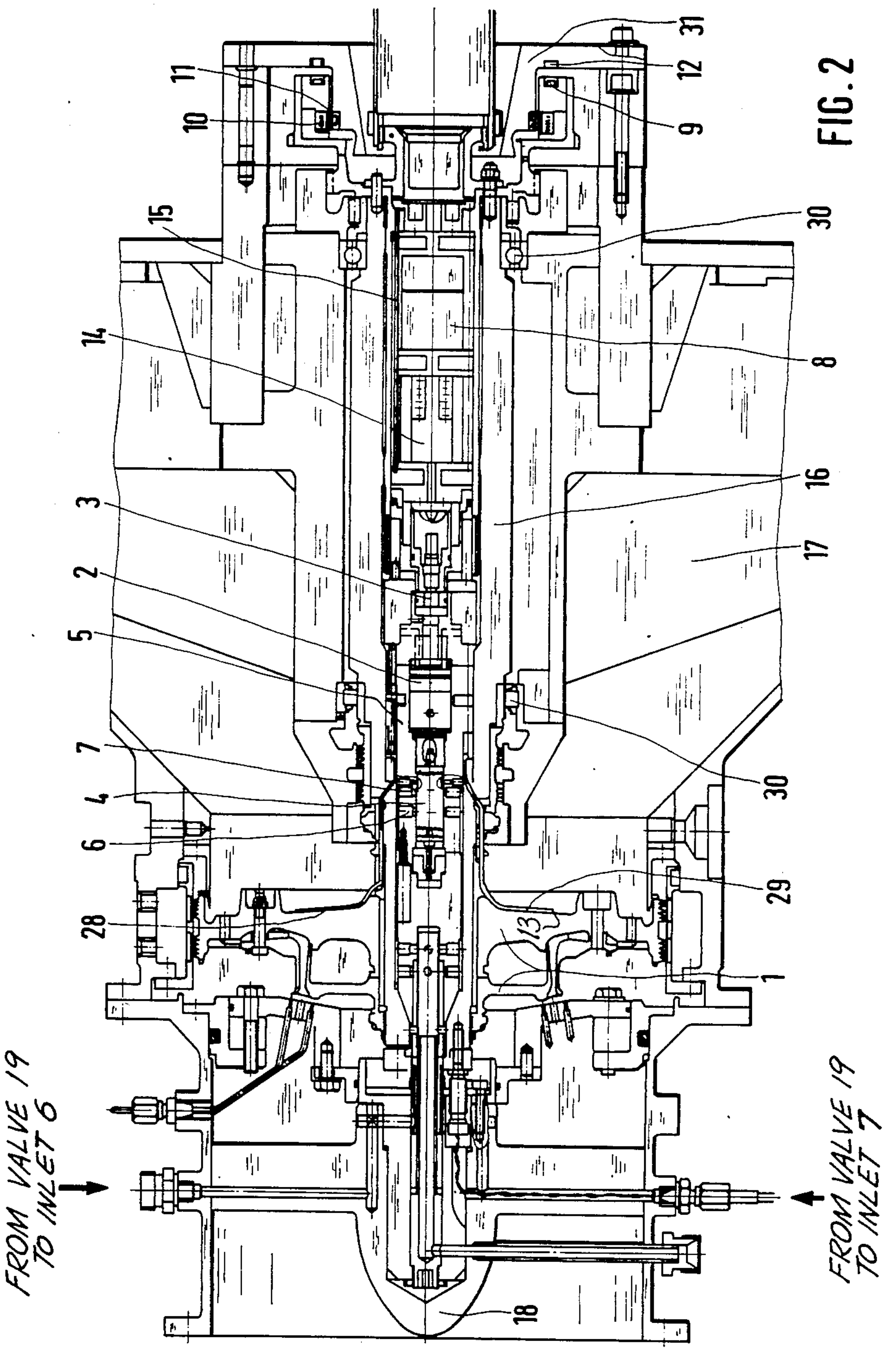
FIG. 2 is a sectional view diagrammatically illustrating the apparatus of the invention inside a carrier.

FIG. 2 illustrates an arrangement of the components in an assembly, in which the pressure test lines from several different points of a rotating test specimen i.e. rotor 1 are connected to pressure test point selector switch 2 arranged at the center of the shaft of the rotor. The switch 2 connects a selected one of the pressure test lines at a time to pressure sensor 3 which may be a piezoresistive pressure sensor. The test point selector switch 2 is actuated by means of pneumatic stepping motor 4. The stepping motor 4 and the pressure selector switch 2 are retained within a retaining and connecting component 5. The elements 2, 4 and 5 plug into one another. The actuating air for the stepping motor 4 is admitted through two concentrically arranged compressed-air lines 6 and 7 which are sealed at the rotor-to-stator interface (left-hand side in FIG. 2) such that wear is precluded. For coding the test point selector switch, the actuating air from valve 19 connects to two switch inlets connected to lines 6 and 7.

The pressure sensor 3 supplies an electrical signal to the pressure transmitter module 8, and its output signal is converted in the transmitter module 8 to frequency-modulated RF signals for non-contact transmission from the rotating test specimen 1 to the stator 3 via the transmitter antenna 9.

Power is supplied to the transmitter modules in non-contact manner through the inductively coupled coil system including rotor coil 10 and stator coil 11. Also arranged on the stator is the receiver antenna 12. Interconnected within a hollow tubular shaft 16 of the rotor of the turbomachine are test point selector switch 2, pressure sensor 3, any additional sensors as required, the transmitter antenna 9 and associated antenna modules 8, the interconnection of the elements being obtained by retaining and connecting links and/or carriers, such as 5,15. When interconnected, the assembly can be inserted into the tubular shaft 16 of the turbomachine.

For accurate results, the effect of centrifugal forces in rotating systems on pressure test lines and the medium they carry is offset by compensation signals. The corrective compensation signals are based on the rotational speed and also the temperature of the medium. Temperature signals are obtained by temperature probes constituted as thermocouples 13 which, together with their connection lines 29, are arranged along radially extending sections of the pressure test lines 28. The thermocouples are connected to the telemetry carrier by plug-in connectors.

The temperatures sensed by thermocouples 13 are transmitted, together with the temperatures of the pressure sensor and the electronic pressure unit, to the stator side in the form of frequency-modulated RF signals and by non-contact arrangement through a second electronic unit i.e. module 14. The temperatures of the pressure sensor and the pressure transmitter module are used to correct their temperature-induced errors in a manner known to those skilled in the art.

For a multichannel pressure test system, these correction techniques give an instrument quality of ±0.2% of the test range over an approximate temperature range at the shaft center of 275° to 400° K. and for speeds up to about 50,000 rpm. The useful life of the system is practically unlimited, considering that all transmission from the rotor to the stator and back are achieved through a non-contact arrangement and that the electrical power for the components in the rotor comes from the stator. This holds equally true of the pneumatic supply.

Figure 3:
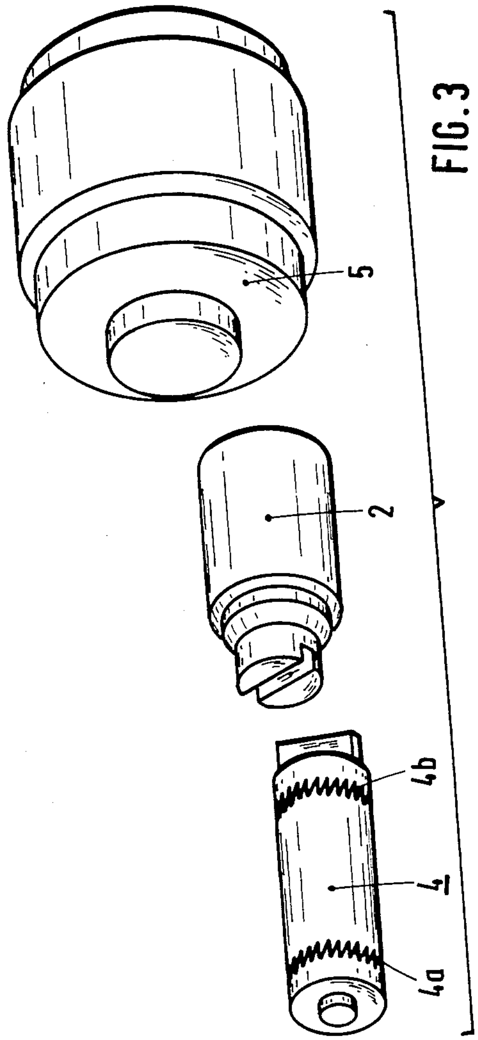
FIG. 3 shows the pneumatic stepping motor, the pressure selector switch plus the retaining and connecting components of the apparatus.

As it will become apparent from FIG. 3, the pressure selector switch 2, which rotates together with the tubular shaft 16 and is mounted in a special holder 5, is preceded by the pneumatic stepping motor 4.

Figure 4:
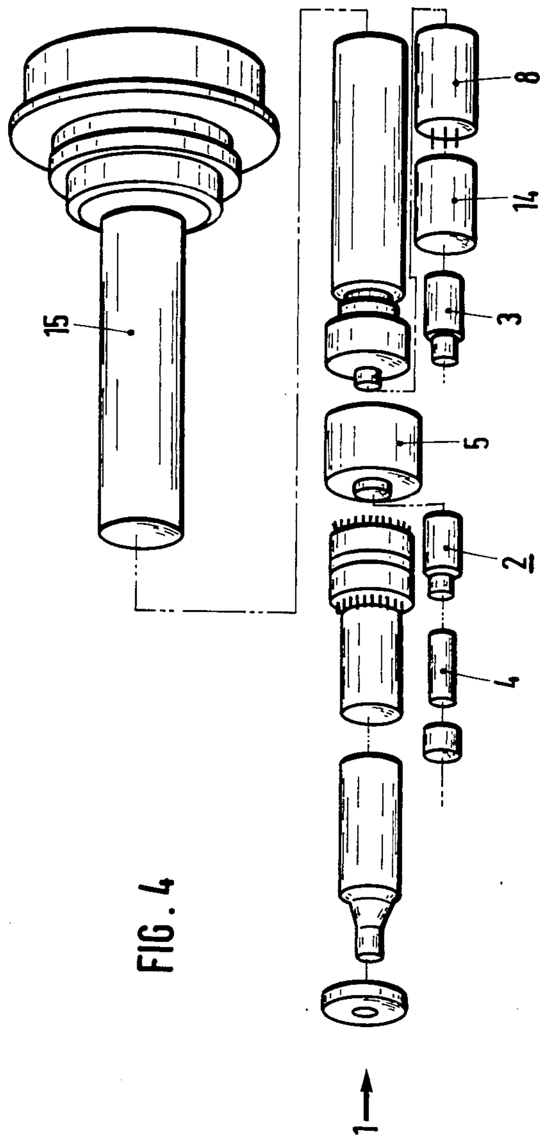
FIG. 4 shows the components in FIG. 3 with the addition of a telemetry carrier, transmitter modules, antenna and associated retaining and connecting parts.

Shown also in FIG. 4 are a pressure sensor 3, a temperature transmitter 14, and a carrier 15 for the telemetry device. Through these, the output signal from the pressure sensor 3, which rotates together with the shaft 16, is fed to the transmitter antenna 9 via the transmitter module 8. Also connected to the RF antenna 9 is transmitter module 8 to transmit the test signals from one or several thermocouples 13.

The rotating pressure selector switch 2 is installed in the telemetry carrier 15. The pressure selector switch 2 enables a plurality of pressure test points to be connected and incrementally linked with the outgoing channel. With an incremental angular movement about the axis of rotation (axis of tubular shaft 16), the pressure selector switch 2 selectively connects one of the incoming channels at a time to the pressure sensor 3. Its movements are precisely controlled by the pneumatic stepping motor 4, e.g., in sector increments. Mounted in the center portion of the stepping motor is a partition which can reciprocate as a piston to form two chambers. The piston moves a shaft, at the two ends of which, face gears 4*a* and 4*b* are arranged (cf. FIGS. 3 and 4). For each actuating movement, one of the face gears 4*a* and 4*b* engages with respective serrations on the cylinder. The pitch of the serrations is such that the shaft of the stepping motor rotates through 10° at a time. A coupling element on the stepping motor shaft operates the selector switch without any backlash. The pressure selector switch 2 is also plugged into the telemetry carrier 15 as an integrated part.

FIGS. 2 and 4 illustrate the entire pressure test and telemetric device plugged together into a single unit for installation in a tubular shaft 16 revolving in the turbomachine 17 and the hub 18. The actuating air for the pneumatic stepping motor is centrally ducted into the tubular shaft 16 through the compressed-air lines 6,7. Both lines 6,7 in the rotor 1 are sealed by means of air-gap and labyrinth seals. The actuating pressure was about 2 bars. Pressure pulses of about 30 ms were sufficient for stepping motor actuation. Solenoid valves 19 were used to alternately pressurize the actuating-air lines 6 and 7 to drive the stepping motor 4. The electrical signals for the solenoid valves and the pressure pulses for the actuating-air lines come from electronic control unit 20 (see FIG. 1). The test channels are selected in this unit. A preselect keypad of the control unit is electrically interlocked to prevent keying errors. For coding the test point selector switch 2, the pneumatic pressure lines are fixedly connected to two switch inlets for unique identification.

Although the invention has been described in relation to a specific embodiment thereof, it will become apparent to those skilled in the art that numerous modifications and variations can be made within the scope and spirit of the invention as defined in the attached claims.

What is claimed is:

1. Apparatus for measuring pressures in a gas turbine engine comprising a stator, a rotatable shaft, a rotor on said shaft, first sensor means including a plurality of inputs measuring pressure at respective test points, said shaft being tubular and including therein in coaxial arrangement for rotation with said shaft:

selector switch means for selection of signals from respective test points, stepping motor means for driving the selector switch means stepwise for selective connection with the respective test points, a retaining and connecting component for said selector switch means, pressure sensor means connected to said switch means for receiving the pressure from the respective test point, further sensor means for measuring further conditions in the engine apart from pressure, first transmitter means for the telemetric remote transmission of the pressure signals from the pressure sensor means, second transmitter means for the telemetric remote transmission of signals representing the further conditions, a support carrier for said first and second transmitter means, a transmitter antenna connected to said first and second transmitter means, current supply means connected to said first and second transmitter means, said first and second transmitter means transmitting the pressure and the further condition signals as test data to said stator via said transmitter antenna as frequency modulated RF signals.

2. Apparatus as claimed in claim 1 wherein said further sensor means comprises a temperature sensor.

3. Apparatus as claimed in claim 1 comprising a rotating system inclusive of said shaft, said sensor means being arranged exclusively in said rotating system, and a non-contact receiver means on said stator for telemetric reception of test data from said transmitter antenna.

4. Apparatus as claimed in claim 3 wherein said selector switch means comprises a selector switch selectively connecting test pressure lines one at a time to said pressure sensor means.

5. Apparatus as claimed in claim 4 wherein said stepping motor means comprises a pneumatic stepping motor, valve means controlling said motor, and control means for operating said valve means.

6. Apparatus as claimed in claim 3 wherein said receiver means comprises a receiver antenna, a test data receiver connected to said receiver antenna, a demultiplexer connected to said test data receiver, and display means connected to said demultiplexer.

7. Apparatus as claimed in claim 6 wherein said current supply means comprises a first induction coil associated with said rotating system, said stator including a second induction coil for inducing current flow in said first coil and oscillation means on said stator connected to said second induction coil.

8. Apparatus as claimed in claim 7 further comprising an external channel selector switch means on said stator connected to said demultiplexer for selecting different types of test data.

9. Apparatus as claimed in claim 1 wherein said pressure sensor means includes sensors for measuring pressure during rotation of said rotor, said selector switch means comprising a pneumatic switch, said apparatus further comprising pneumatic control means externally operative for operating said switch.

10. Apparatus as claimed in claim 1 wherein said stepping motor means comprises a pneumatic stepping motor, said apparatus further comprising compressed air lines in said stator for conveying compressed air to said pneumatic stepping motor, and seal means between said lines and said stepping motor.

11. Apparatus as claimed in claim 1 wherein said stepping motor means produces incremental angular movement of said switch means.

12. Apparatus as claimed in claim 11 wherein for each incremental angular movement of said switch means the pressure at a respective test point is supplied to the pressure sensor means.

13. Apparatus as claimed in claim 1 further comprising a power supply means for non-contact power supply from said stator to said rotor, said power supply means comprising inductively coupled coils respectively on said stator and rotor in noncontact arrangement.

14. Apparatus as claimed in claim 1 wherein said pressure sensor means, said switch means and said motor means are interconnected as a plug-in unit arranged inside said tubular shaft.

15. Apparatus as claimed in claim 1 further comprising two compressed-air lines carrying actuating air to said selector switch means, said switch means having two selector switch inlets for said lines to permit coding thereof.

16. Apparatus as claimed in claim 1 further comprising pressure test lines connecting the plurality of inputs measuring pressure to said selector switch means, said further sensor means sensing temperature as said further condition and including temperature test elements associated with said pressure test lines.

17. Apparatus as claimed in claim 1 wherein said further conditions measured by the further sensor means are temperature conditions, said stator including receiver means for telemetric reception of said test data, said receiver means including means for converting said temperature condition signals from said further sensor means to correction signals for application to said pressure signals.

18. Apparatus as claimed in claim 1 wherein said test data and the transmission and reception thereof are of multichannel configuration.

19. Apparatus as claimed in claim 1 wherein said pressure sensor means and said further sensor means are connected in axial succession.

20. Apparatus as claimed in claim 1 wherein said pressure sensor means and said further sensor means are connected in axial succession plugged into one another.

21. Apparatus as claimed in claim 14 wherein said plug-in unit has first and second opposite axial ends and includes at the first end connectors for actuating air to operate said motor means, and at one of said ends, said transmitter antenna and a coil of said current supply means.

22. A method of measuring pressures in a turbomachine comprising the steps of:

measuring pressure at a plurality of test points in a rotating part of a turbomachine, selecting a test point at which the pressure is to be determined while said rotating part is rotating by displacing a switching member on said rotating part relative thereto, the displacement of the switching member being effected from outside the rotating part, receiving the pressure measured at the selected test point and converting the pressure to an electrical signal, measuring further conditions in the turbomachine apart from pressure and converting the same to electrical signals, transmitting the signals representing the pressure and the further conditions telemetrically to a remote stationary location, and supplying electrical power to the equipment on the rotating part which serves to carry out the above steps, said electrical power being supplied from a stationary location inductively without contact to said equipment.

23. A method as claimed in claim 21 wherein said further conditions include temperature measurement.

24. A method as claimed in claim 21 wherein the signals representing the pressure and the further conditions are telemetrically transmitted on separate channels.

* * * * *